Patented May 11, 1926.

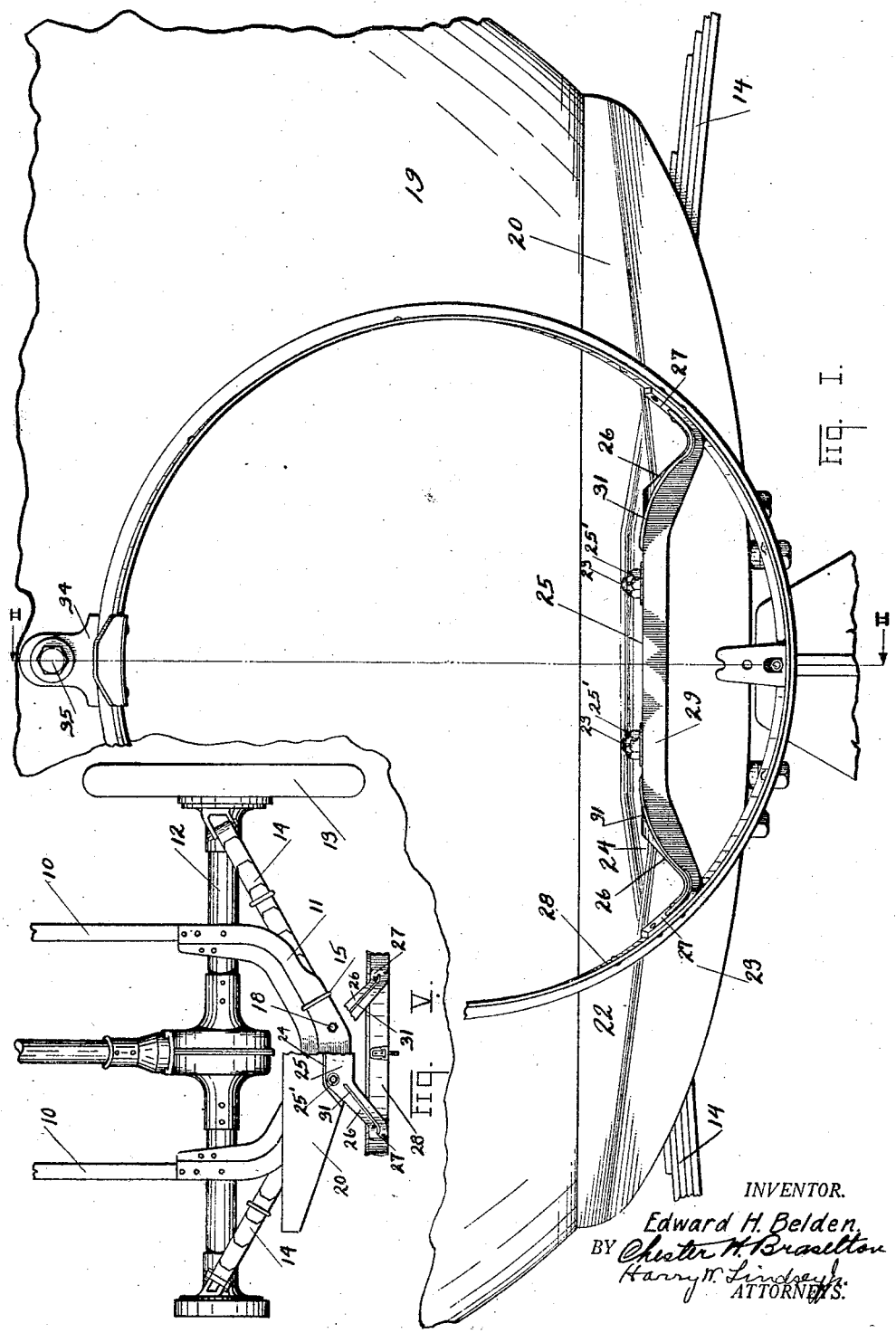

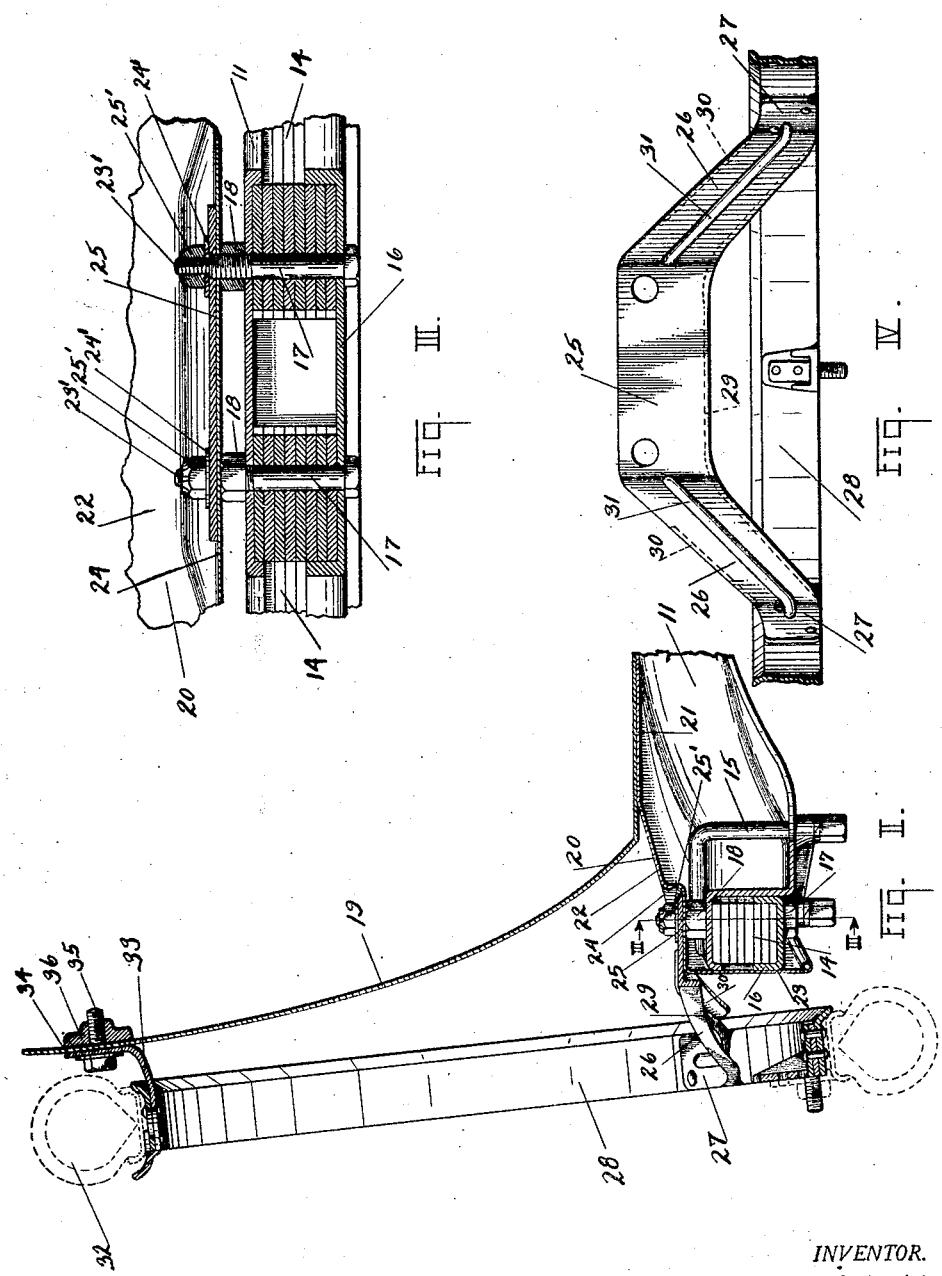

1,584,690

UNITED STATES PATENT OFFICE.

EDWARD H. BELDEN, OF TOLEDO, OHIO, ASSIGNOR TO THE WILLYS-OVERLAND COMPANY, OF TOLEDO, OHIO, A CORPORATION OF OHIO.

TIRE CARRIER.

Application filed September 7, 1920. Serial No. 408,652.

The present invention relates to tire carriers for motor vehicles and has for its object to provide a carrier, the parts of which are simple in construction, light in weight and inexpensive to manufacture and which when assembled affords a strong and rigid support for the spare tire.

Another object of the invention is to provide, in combination with a pair of opposed springs and a connecting member therefor, an improved tire carrier adapted to be secured to said connecting member at a point adjacent the inner ends of the springs.

Another object of the invention is to provide, in combination with a pair of side frame members and an arched end connected therefor, an improved tire carrier adapted for connection to said arched member at the center thereof.

Another object of the invention is to provide, in combination with the running gear of an automobile, including side frame members connected at their rear ends by an arch shaped member adapted to receive the inner ends of a pair of opposed springs, a tire carrier bracket adapted for connection to the arch shaped member, with common means for connecting said bracket and arch shaped member with the inner ends of said springs.

Another object of the invention is to provide, in combination with a cover plate for the rear springs and frame of an automobile, an improved tire carrier adapted to be secured at one point to said cover plate and at another to the body of the vehicle.

Another object of the invention is to provide an improved tire carrier and cover plate construction for the rear frame portion of an automobile, with common means for connecting the carrier and cover with the frame.

Another object of the invention is to provide an improved bracket adapted for connection with the rear of an automobile and arranged to support a tire holding ring.

To these and other ends the invention comprises certain novel features of construction and arrangement of parts as will be hereinafter more fully pointed out and claimed, it being apparent to those skilled in the art that the invention shown and described herein is susceptible of various modifications, embodiments and arrangements to suit special or varying conditions and I wish it to be understood that the terms which I have used are merely descriptive and not limiting and that it is my intention to include any and all modifications which come within the scope of the invention as expressed in the appended claims.

A structure constituting one embodiment of my invention is illustrated in the accompanying drawings in which:

Figure I is a rear elevation of a carrier embodying the invention.

Figure II is a fragmentary sectional elevation taken on line II—II of Figure I.

Figure III is a transverse sectional elevation taken on lines III—III of Figure II.

Figure IV is a detailed plan of the bracket shown in Figure II for supporting the tire holding ring and:

Figure V is a plan view illustrating the manner of mounting the tire carrier upon the rear frame portion of the automobile, certain parts being broken away to more clearly illustrate the application of the carrier to the frame and cover plate therefor.

Similar reference numerals refer to similar parts throughout the several views of the drawings.

Referring to the drawings, I have shown the rear end of a motor vehicle, comprising the side frame channels 10, the rear ends of which are connected by an arch shaped member 11, the sides of which converge to a point on the longitudinal center line of the vehicle as indicated in Figure V. Upon the rear axle 12 is mounted the driving wheels 13 and connected with the axle are the converging springs 14, the inner ends of which project beneath the sides of the arch shaped frame connection 11 to a point adjacent the center thereof. The inner ends of the converging springs 14 are preferably connected with the arch shaped member 11 by means of the U-bolts 15 as shown in Figures II and V. The arch shaped member is preferably in the form of a Z-bar with the lower flange extending forwardly and the upper flange extending rearwardly and lying upon the inner ends of the springs 14 which are disposed within a channel shaped member forming a connection for the springs, the springs, channel shaped member 16 and upper flange of the arched Z-bar 11 being all firmly connected by the vertically disposed bolts 17, the nuts 18 of which rest upon the upper flange of the Z-bar 11 as shown in Figures II and III. At the rear of the body 19 and extending substantially the full width thereof is provided a cover plate 20 adapted to cover the springs 14 and arch frame connection 11, said cover plate having a forwardly extending portion 21 disposed beneath the body 19 and a rearwardly extending and downwardly inclined portion 22 terminating in a vertically disposed flange 23, said inclined portion 22 and flange 23 serving to cover and protect the top and rear sides of the arched Z-bar 11, channel shaped member 16 and inner ends of the springs 14 as clearly shown in Figures I and II. The cover plate 20 is provided centrally of the vehicle frame with a depressed portion 24 to receive the central body portion 25 of the carrier bracket as shown in Figure II. The cover plate 20 rests upon the nuts 18 of the bolts 17, said bolts being provided with reduced extensions 23' which project through the cover plate and body portion 25 of the carrier bracket to receive the washers 24' and nuts 25' which serve to clamp the cover plate and carrier bracket upon the nuts 18 as best shown in Figures II and III. In this construction, common means is provided for connecting the inner ends of the springs 14 with the arched frame member 11 and cover plate and carrier bracket, all as shown in Figure II. The body portion 25 of the bracket is provided with oppositely and laterally extending arms 26 which extend rearwardly and downwardly from the cover plate. The ends of the arms are turned upwardly as indicated at 27 and seated upon and connected with the inner periphery of the tire holding ring 28. The body 25 of the bracket and the arms 26 thereof are provided at one side with a continuous downwardly extending flange 29 serving to stiffen and strengthen the bracket, while on the opposite side of the arms are provided stiffening and strengthening flanges 30, and centrally disposed thereon are the upstanding ribs 31 which also serve to stiffen and brace the arms to afford a more or less rigid support for the tire holding ring 28 which is adapted to support the spare tire 32 as indicated by dotted lines in Figure II. The tire holding ring 28 is connected at its upper side with the back of the body 19 by means of a bracket having a rearwardly extending portion 33 connected with the ring and a vertically disposed portion 34 secured upon the body by means of the bolt 35 and nut 36, as indicated in the upper part of Figure II. Any suitable retaining means may be provided for holding the tire upon the ring and for locking it thereon. However, the detailed construction of the ring and the locking means for the tire is immaterial to the present invention and therefor a description of the same will not be necessary in the present application. The cover plate 20 serves the double purpose of covering and protecting the arched frame connection 11 and inner ends of the springs 14 and forms as well a rigid support for the carrier bracket and tire holding ring mounted thereon. It will be noted that the arms of the bracket are relatively short and are well braced and stiffened by the flanges and ribs thereon and therefore afford a strong and rigid support for the tire holding ring and permit the same to be mounted close to the back of the body of the vehicle as indicated in Figure II, the top of the ring being also rigidly connected with the body of the vehicle whereby the tire is supported in a substantially vertical position without any appreciable overhang at the rear of the vehicle, whereby excessive vibration of the tire holding carrier is prevented.

While the form of structure herein shown and described is admirably adapted to fulfill the objects primarily stated, it is to be understood that various changes in form, proportion and minor details of construction may be resorted to without departing from the spirit of the invention as expressed in the appended claims.

What I claim as new and desire to secure by Letters Patent is:

1. In a motor vehicle, the combination of an axle, a frame, a spring interposed between the axle and the frame, a tire holder mounted upon the frame, and common means connecting said frame, spring and tire holder and permitting the holder to be removed without loosening the connection between the frame and spring.

2. A motor vehicle frame structure comprising side frame members, a connecting end member therefor, a spring for the frame disposed on the under side of said connecting member, a bolt extending upwardly through said spring and said end connecting member, a nut on the bolt engaging the upper face of said conecting member, and a member connected to said bolt for removal therefrom without removal of said nut, said member having outwardly extending arms adapted for connection with a tire holding member.

3. A motor vehicle frame structure comprising side frame members, a connecting end member therefor, a spring for the frame disposed on the under side of said connecting end member, a bolt extending upwardly through said spring and end connecting member, a nut on the bolt engaging the upper face of said connecting member, said bolt having a reduced extension adapted to receive a tire carrier, and a nut threaded upon the reduced extension for securing the carrier in place.

In testimony whereof, I affix my signature.

EDWARD H. BELDEN.